L. H. Olmsted.
Chuck,

N°. 54,760.   Patented May. 15, 1866.

Witnesses;
H. W. Gilbert
G. W. Patterson

Inventor;
L. H. Olmsted

UNITED STATES PATENT OFFICE.

L. H. OLMSTED, OF STAMFORD, CONNECTICUT.

IMPROVEMENT IN CHUCKS.

Specification forming part of Letters Patent No. 54,760, dated May 15, 1866.

*To all whom it may concern:*

Be it known that I, LEVERETT HOMER OLMSTED, of Stamford, in the county of Fairfield and State of Connecticut, have invented a new and Improved Chuck for Holding Drills and other Tools, and also for holding work to be turned; and I do hereby declare that the following is a full, clear, and exact description of the construction and operation of the same, reference being had to the accompanying drawings, making a part of this specification, in which—

Figure 1:
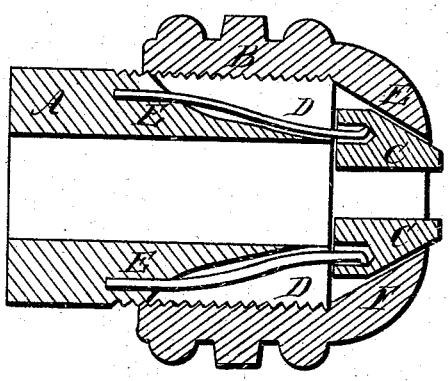
Figure 2:
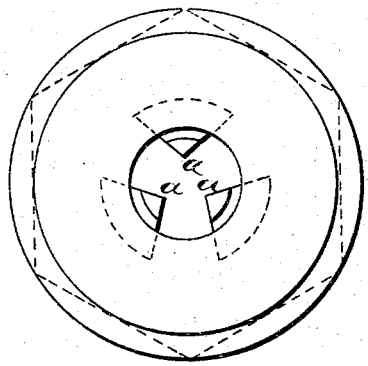
Figure 3:

Figure 1 is a longitudinal section; Fig. 2, an end view; Fig. 3, an end view of one of the jaws.

A, Fig. 1, is the spindle of the chuck. B is the nut; C C, the jaws, and D D the springs.

This invention consists in making a nut, the hole for the thread not being bored through its whole length, a hole being bored through only sufficiently large to admit a piece of work for which the size of the chuck is intended. The space between the inner end of the thread and the face of the nut is made tapering for the purpose of closing the jaws, which are turned to fit the taper in the nut, and are cut into segments, so that when the nut is being screwed onto a spindle the jaw will be brought to bear against the end of the spindle, thereby forcing them together, or against the work which is placed between them. When the nut is being screwed off from the spindle the jaws are opened by springs which are made fast to the spindle, the ends of the springs entering holes made in the jaws for that purpose.

To enable others skilled in the art to make and use my invention, I will proceed to describe its construction and operation with reference to the drawings.

A, Fig. 1, is the spindle, which has a hole through its center, and a screw is cut upon the outside. There are slits cut into the spindle for the purpose of placing the springs as shown at D D. D D are the springs, one end of which is fastened to the spindle at E E, the other end extending into holes made in the jaws C C. The springs are set so that they press the jaws against the taper part of the nut B, so that when the nut is being screwed off from the spindle the jaws will open to receive the work, and the nut being tapered, as shown at F F, when the nut is being screwed on the spindle the jaws (which are also tapered to correspond with the nut) are closed together or against the work that may be placed between them.

Fig. 3 represents an end view of one of the jaws, the radius of which is shorter than the radius of the taper which is turned inside of the nut.

I also make the distance between $a$ and $b$ greater than between $a$ and C. By doing this when any resistance is offered to the tool or work revolving which is held between the jaws, they will turn on their periphery, thereby moving the points $a$ nearer together, and acting upon the work as cams, thereby making the chuck self-tightening.

What I claim as new, and desire to secure by Letters Patent, is—

Making a chuck, substantially as shown and described.

L. H. OLMSTED.

Witnesses:
H. W. GILBERT,
G. W. PATTERSON.